Oct. 2, 1962

J. D. RYAN 3,056,187

GLASS DOOR CONSTRUCTION

Filed Oct. 15, 1958

INVENTOR.
BY Joseph D. Ryan
Nobbe & Swope
ATTORNEYS

United States Patent Office 3,056,187
Patented Oct. 2, 1962

3,056,187
GLASS DOOR CONSTRUCTION
Joseph D. Ryan, Toledo, Ohio, assignor to Libbey-Owens-Ford Glass Company, Toledo, Ohio, a corporation of Ohio
Filed Oct. 15, 1958, Ser. No. 767,347
9 Claims. (Cl. 29—155)

The invention relates broadly to the mounting of glass panel constructions, and more particularly it has to do with an improved door construction comprising a glass panel with metal channel members on the upper and lower edges.

The use of glass panels are being widely received in modern building constructions for use as doors, walls, partitions and the like. These panels have been found to be particularly useful as heavy door constructions, facing members and partitions for toilet stalls. However, difficulties are encountered in attaching hardware articles such as hinges, sashes, blocks, handles and mounting channels to the glass panels due to the frangibility of glass which prevents these articles of hardware usually of metal from being satisfactorily screwed, bolted or nailed thereto, as with conventional wood or metal panels.

The best solution to this problem of attaching metal to glass panels has been found by "anchoring" the metallic articles in recessed portions of the glass panels. To accomplish this, solidified filler materials of many types have been used. However, to be fully satisfactory such filler materials must possess a number of special properties. The material must be capable of being poured easily into small spaces and at a temperature which is sufficiently low to not injure either the hardware or the glass panel. Of course, the melting temperature of the filler material cannot be so low that under normal ambient temperatures it would become soft during use and cause collapse and damage to the panel structure. Also, the material should set up or solidify in a relatively short time for best results in a production process. In addition, the filler should show good "growth" characteristics. That is, it should expand after solidification at normal room temperature to cause a tight and secure anchoring of the hardware with the glass panel. At the same time, the filler material must not have an excessive growth character otherwise the glass panel may be strained or an unsightly appearance will be produced because of a tendency to bulge outward over adjacent glass areas. The most satisfactory materials which have all of these characteristics that have been found to date are low melting alloys composed of bismuth, lead and tin.

However, it has been found that when metal hardware is anchored by the use of such low melting metallic filler materials, there is a tendency for the hardware to corrode and deteriorate. This is particularly true in the case of aluminum metal parts and a filler material of the bismuth-lead-tin alloy. This deterioration is quite severe and it has been determined to be primarily attributable to an electrolytic action between the dissimilar metals of the alloy and the channel.

Briefly, it is the concept of the present invention to overcome such objectionable corrosive action by the application of a special heat resistant organic coating material to the metal surfaces which are to contact the filler material.

In the drawings wherein like numerals are employed to designate like parts throughout the same:

Figure 1:
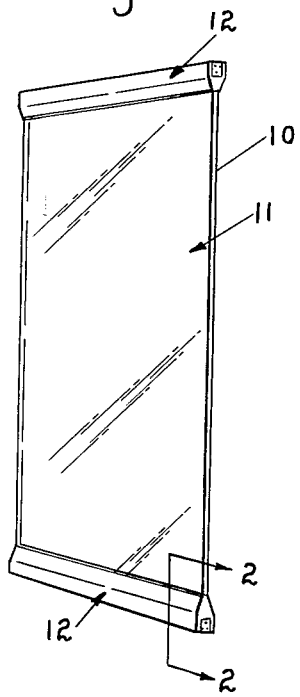
FIG. 1 is a perspective view of a glass door with which the present invention has particular utility.

Referring now particularly to the drawings there is illustrated in FIG. 1 a glass door construction 10 comprising a sheet 11 of tempered glass with metal sashes 12 attached to a pair of opposed edges which are disposed respectively along the upper and lower marginal portions of the sheet 11.

Figure 2:
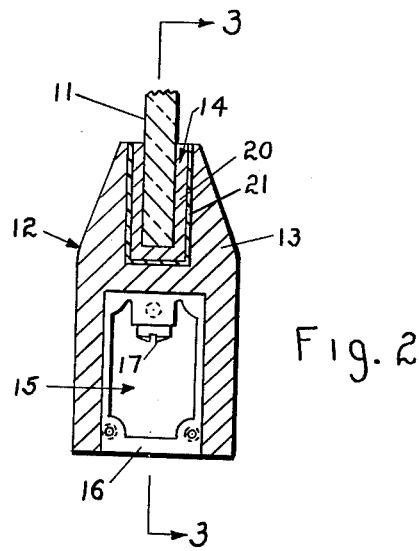
FIG. 2 is a transverse sectional view through the bottom edge of the door and sash attached thereto taken along line 2—2 of FIG. 1.
Figure 3:
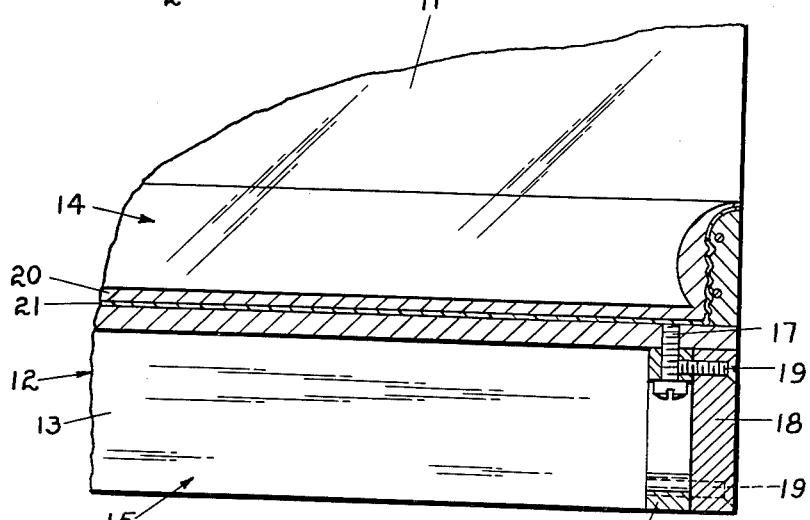
FIG. 3 is a longitudinal sectional view through the bottom edge of the door and sash taken along line 3—3 of FIG. 2.

As shown in FIG. 2, each of the sashes 12 comprise an elongated metal channel body portion 13 of substantially H-shaped cross section to provide cavities 14 and 15. It will be appreciated that the upper sash 12 is located in inverted relation to the lower sash 12 so that the respective upper and lower edges of sheet 11 will be received in the same cavity of each sash. Thus, as shown in FIG. 2, the lower edge of the glass panel 11 is received in the upper cavity 14 of the body portion 13 of the respective sash 12; said cavity being so dimensioned as to provide a suitable space between the glass sheet and the surfaces of the cavity. The lower cavity 15 is provided with an insert 16 which is secured to the body portion 13 by screw 17. A cover plate 18 (FIG. 3) is affixed to the insert 16 by screws 19 to seal off the end of the sash 12 and to strengthen it.

In order to secure the sashes 12 to the glass plate in such a structure it has been customary to fill the space between the glass and the metal sash 12 by pouring a low melting temperature metallic alloy 20 therein which on setting up anchors the glass sheet 11 in the sash 12. However, as was mentioned above a construction of this type is susceptible to corrosion through electrolytic action between the filler metal and the hardware.

Now, however, in accordance with this invention, the electrolytic deterioration of the sash is overcome by providing the inner surface of the upper cavity 14 of the sash 12 with a coating 21 of a particular high temperature organic material which will serve as a chemical and an electrical barrier between the dissimilar metals precluding either electrolytic or chemical action taking place between the metal of the sash and the metal of the filler 20.

In addition to electrolytic and corrosion resistant properties a suitable organic material for accomplishing the purpose of the invention must have relatively high heat resistant properties in order to prevent its deterioration or destruction when the molten filler 20 is poured over its surface during formation of the anchoring layer. To date silicone materials have been found to be most satisfactory for this purpose and the two which have given the most satisfactory results are the following silicone resins:

(1) An ester of a polymeric silanol with a fatty acid modified condensation product of an epihalohydrin and bisphenol. Such a silicone modified epoxy coating resin is sold by the Plaskon Corporation under the designation ST-847.

(2) An ethyl phenyl silicone coating resin which may be prepared either from ethylphenyldichlorosilane or by co-condensation of mixed ethyl and phenylchlorosilanes. A commercially available coating material of this type is sold by the Dow-Corning Corporation as silicone varnish 993.

In practicing the invention these coating materials are applied onto the metal surface by either brushing or spraying and the coated metal part is then baked or cured in an oven at a temperature and for a length of time necessary to cure the silicone resin. As regards the particular coating materials specified above the temperature and curing times are as follows:

(1) Silicone modified epoxy—45 minutes at 400° F.
(2) Ethyl phenyl silicone—4 hours at 480° F.

In order to determine the effectiveness of the protective coating operation of the invention several samples of aluminum channels of the type described herein were coated on their inside surfaces with each of the above defined coating materials. Then a molten bismuth-lead-tin alloy at a temperature of about 400° F. was cast into these coated channel selections. There was no apparent adverse effect on any of the coating materials. These samples were then immersed in a 20% aqueous solution of calcium chloride at normal room temperature. As a control for the test two uncoated aluminum channel sections were filled with the same alloy in the same manner as above and also immersed in the same solution. All of the samples were left in the calcium chloride bath for fifty days. At the end of this time the control samples showed evidence of substantial corrosion between the aluminum and filler, whereas no evidence of corrosion could be found on any of the coated test samples.

Additional test and control samples were mounted on racks and placed on the roof on a building so they would be fully exposed to the elements. These samples were sprayed weekly with a calcium chloride solution (20% by weight) for the period of one year. The samples were then broken apart and it was found that the inside channel surface of the control samples were severely corroded whereas those samples coated with the protective materials of the invention were practically corrosion free.

The reason the samples in both of the above tests were treated with a calcium chloride solution is that this chemical is widely used on streets for removing ice, and it has been found to be the primary source of corrosion on door structures of the type disclosed herein.

I claim:

1. In a method of securing a glass panel into a recessed channel of a framing member fabricated of an aluminum allow the steps of, applying a coating of heat-resistant silicone liquid to the surfaces of said channel, heating said liquid to form a cured, heat-resistant silicone resin on said surfaces, positioning the glass panel in said channel in spaced relationship with respect to the surfaces thereof, and pouring a molten bismuth-lead-tin alloy into the space between the panel and the surfaces of the channel to secure said parts together in fixed relationship.

2. The method of claim 1 wherein the silicone is an ester of a polymeric silanol with a fatty acid modified condensation product of an epihalohydrin and of bisphenol.

3. The method of claim 1 wherein the silicone is an ethyl phenyl silicone prepared from ethylphenyldichlorosilane.

4. The method of claim 1 wherein the silicone is an ethyl phenyl silicone prepared by co-condensation of mixed ethyl and phenyl chlorosilanes.

5. The method reducing corrosion between an aluminum alloy and a bismuth-lead-tin alloy comprising providing a coating between said alloys consisting of a silicone resin.

6. The method of claim 5 wherein the silicone is an ester of a polymeric silanol with a fatty acid modified condensation product of an epihalohydrin and of bisphenol.

7. The method of claim 5 wherein the silicone is an ethyl phenyl silicone prepared from ethylphenyldichlorosilane.

8. The method of claim 5 wherein the silicone is an ethyl phenyl silicone prepared by co-condensation of mixed ethyl and phenyl chlorosilanes.

9. The new use of an ethyl phenyl silicone resin in a glass door structure in which structure a glass sheet is supported within a recess formed in a metallic sash forming part of the structure, which comprises, coating the surfaces of the metallic sash opposite to the glass sheet with ethyl phenyl silicone resin and then positioning a solidified low melting point metallic filler material between the layer of silicone resin and the glass sheet to hold the glass sheet immobile within the recess in the metal sash.

References Cited in the file of this patent

UNITED STATES PATENTS

| | | |
|---|---|---|
| 2,140,672 | Gray et al. | Dec. 20, 1938 |
| 2,155,964 | Bowers | Apr. 25, 1939 |
| 2,258,218 | Rochow | Oct. 7, 1941 |
| 2,386,466 | Hyde | Oct. 9, 1945 |
| 2,777,173 | Caswell | Jan. 15, 1957 |
| 2,787,346 | Goeckel | Apr. 2, 1957 |